United States Patent
Cafarelli

[15] 3,663,142
[45] May 16, 1972

[54] PLASTIC INJECTION MOLDING SYSTEM

[72] Inventor: Ralph Joseph Cafarelli, Clinton, Mass.
[73] Assignee: Nylon Products Corp., Clinton, Mass.
[22] Filed: Feb. 27, 1970
[21] Appl. No.: 14,953

[52] U.S. Cl. ...........................425/217, 18/2 RM, 18/4 R, 209/106
[51] Int. Cl. ............................................................B29f 1/00
[58] Field of Search ............18/1 R, 1 FM, 1 FB, 1 FE, 1 FS, 18/2 RM, 4 R, 4 B, 4 C, 4 S, 4 V, 30 RM, 30 Y; 209/83, 87, 96, 106

[56] References Cited

UNITED STATES PATENTS

| | | | |
|---|---|---|---|
| 3,287,472 | 11/1966 | Wolf et al. | 18/4 R X |
| 622,035 | 3/1899 | Bray | 209/106 X |
| 3,519,129 | 7/1970 | Peterson | 209/106 X |
| 3,172,588 | 3/1965 | Bertold et al. | 18/1 R X |
| 2,733,479 | 2/1956 | English | 18/2 RM UX |
| 3,121,919 | 2/1964 | Turner | 18/30 RM |

*Primary Examiner*—H. A. Kilby, Jr.
*Attorney*—Martin Kirkpatrick

[57] ABSTRACT

A plastic injection molding system for molding workpieces with a connecting plastic tree, including a molding runner and with planar dimensions much greater than the workpieces, and for separating the workpieces from the trees employs plastic injection molding means for producing the workpieces and detached trees, discriminating means, with a surface for separating the workpieces from the trees, and conveying and aligning means for conveying the workpieces and the trees from the molding means to the discriminating means and for aligning the runners with the surface.

1 Claim, 5 Drawing Figures

PLASTIC INJECTION MOLDING SYSTEM

This invention relates to molding materials, especially plastic materials, and in particular to apparatus for automatically separating molded workpieces from waste pieces or from each other and from the gate and runner tree after the workpieces have been detached from the waste pieces and the gate and runner tree within the press itself.

Recovery of the gate and runner tree, which are the "waste" products after the workpieces have been molded, is essential to economical plastic injection molding operations since very often the trees comprise more plastic than the molded workpieces themselves and since they may be reground and melted for re-use. At the same time, the recovery should be performed automatically, thus obviating the expense of additional human labor. Similarly, where workpieces of different sizes are produced simultaneously, it often is desirable or even necessary to separate them according to size before packing, assembling, or shipping them. Again it is preferable that the separation be performed automatically. Finally, it is preferable that both the recovery and separation processes be performed outside the press, so that as little time as possible is lost between successive pressing operations.

In existing pressing operations attendants are employed to convey the gate and runner tree to a grinder and to separate either the workpieces according to size or the workpieces from waste pieces. Often, the separation consumes considerable time during which the press is not operated, impairing the efficiency of the overall pressing operation.

Accordingly, it is an object of the present invention to provide for novel and improved recovery and separation of the workpieces and gate and runner tree with apparatus that is simple, reliable and inexpensive.

Another object of the invention is to provide apparatus which permits continuous pressing of molded parts.

A further object of the invention is to provide apparatus which automatically separates the workpieces from waste pieces according to their size and without requiring an attendant.

A still further object of the invention is to provide such apparatus which simultaneously performs the operations of conveying the gate and runner tree to a grinder and of separating the workpieces from the gate and runner tree.

The invention features a plastic injection molding system for molding a plurality of workpieces, including therebetween a connecting plastic tree with a molding runner and having planar dimensions much greater than the workpieces, and for separating the workpieces from the trees. The system includes plastic injection molding means producing the workpieces and detached trees, and discriminating means for separating the workpieces from the trees and defining a surface having generally horizontal planar dimensions greater than those of the trees. In preferred embodiments the system also has conveying and aligning means for conveying the workpieces and the trees from the molding means to the discriminating means and for aligning the runners with the surface for supporting the runners thereon in parallelism therewith and grinding means for grinding the trees into pellets for reuse; the conveying and aligning means is arranged to convey the trees to the grinding means and includes a chute, the molding means and the generally horizontal surface; the chute has a bottom surface disposed at a substantial angle to the generally horizontal surface, communicates with the molding means and the generally horizontal surface, and is arranged to receive the trees and the workpieces from the molding means and convey the trees and the workpieces to the generally horizontal surface; the molding means and the chute are arranged to cooperate to align the runner with the bottom surface for supporting the runner in parallelism therewith and the chute and the generally horizontal surface are arranged to cooperate to align the runner with the generally horizontal surface for supporting the runner thereon in parallelism therewith after the chute has conveyed the runner to the generally horizontal surface; the surface has a plurality of openings therethrough with a minimum dimension which is greater than the maximum planar dimension of the workpieces and with a maximum dimension which is less than the minimum planar dimension of the trees and the conveying and aligning means is arranged to convey the workpieces and the trees over the generally horizontal surface in the manner that the workpieces pass downwardly through the openings; the discriminating means includes structure defining a plurality of substantially parallel cylindrical frictional surfaces arranged to be rotated simultaneously in the same direction and spaced apart in a horizontal plane and cooperating to define the generally horizontal surface at the upper portions thereof and to define the openings between the cylindrical surfaces; the system includes rotating means for rotating the frictional surfaces and the frictional surfaces when rotated are arranged to receive the trees and the workpieces from the molding means, to carry the trees along the generally horizontal surface, and to carry the workpieces to the openings; the workpieces pass downwardly through the opening.

Other objects, features, and advantages will become apparent from the following description of a preferred embodiment of the invention, taken together with the attached drawings thereof, in which.

Figure 1:
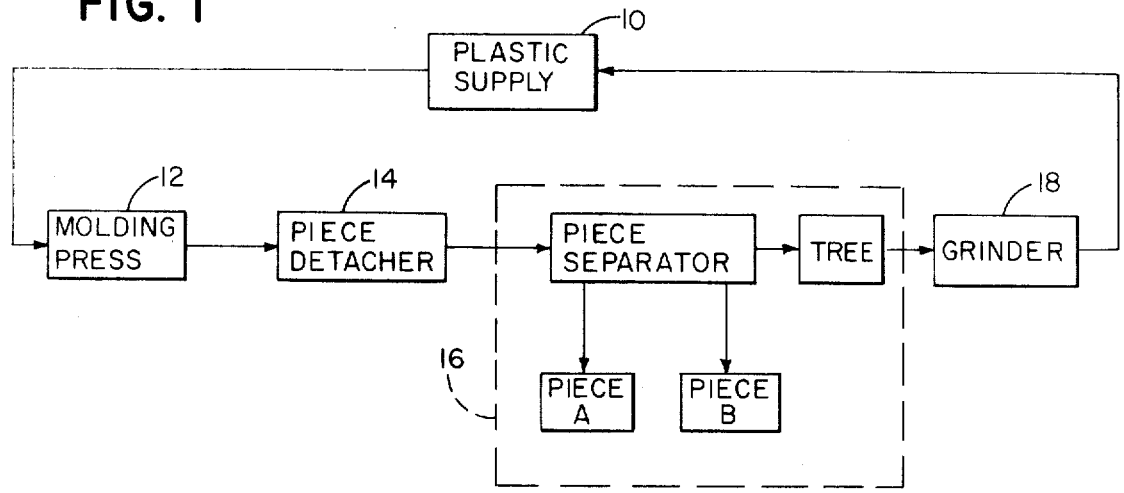
FIG. 1 is a flow diagram in block diagram form illustrating a method, employing the apparatus constructed in accordance with the invention, of separating the pieces and recovering the tree.

Referring to FIG. 1, molten plastic in plastic supply 10 is arranged to be fed to molding press 12 where the plastic is pressed, molded, cooled, and hardened. Piece detacher 14, which may be any of a number of conventional detachers—for example, utilizing reciprocating rods in one of the platens—is arranged to detach the molded products from waste pieces and from the gate and runner tree in the platen and to deliver the pieces and trees to the separation and recovery apparatus, generally designated 16, of the invention. For purposes of illustration it is assumed that the minimum dimension of the tree is greater than the maximum dimension of the larger product piece. Apparatus 16 (to be described in greater detail below) is arranged to receive the pieces, to discriminate between the sizes of the pieces, to separate from the pieces and trees first the smaller waste piece (Piece A), and next the larger workpiece (Piece B), and to deposit the trees in grinder 18. Grinder 18 is arranged to grind the trees into small pellets. After they are ground the pellets are returned to plastic supply 10 where they are melted for re-use.

Figure 2:
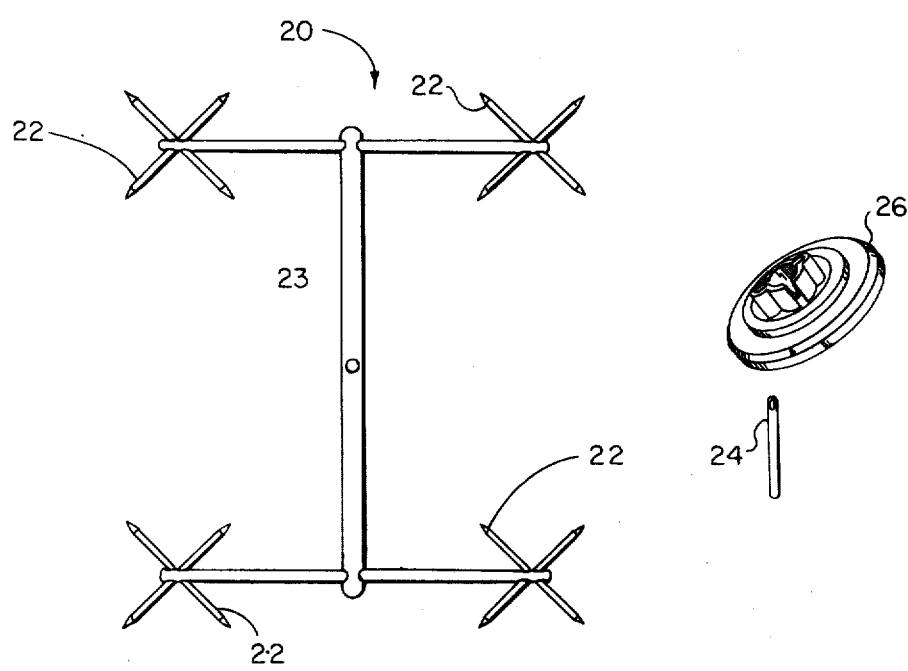
FIG. 2 is a perspective view of a gate and runner tree, together with the two pieces, a workpiece and a waste piece, molded in each gate.

As can be seen in FIG. 2, each tree 20 has 16 gates 22 at the end of each of which two pieces 24 and 26 (only one of each is shown and they are enlarged for clarity) are molded. The smaller piece 24 is a waste piece and has a substantially tubular shape, while the larger piece 26 is the workpiece and is circular with a circumferential flange. Tree 20 has planar dimensions which are substantially greater than the planar dimensions of pieces 24 and 26.

Figure 3:
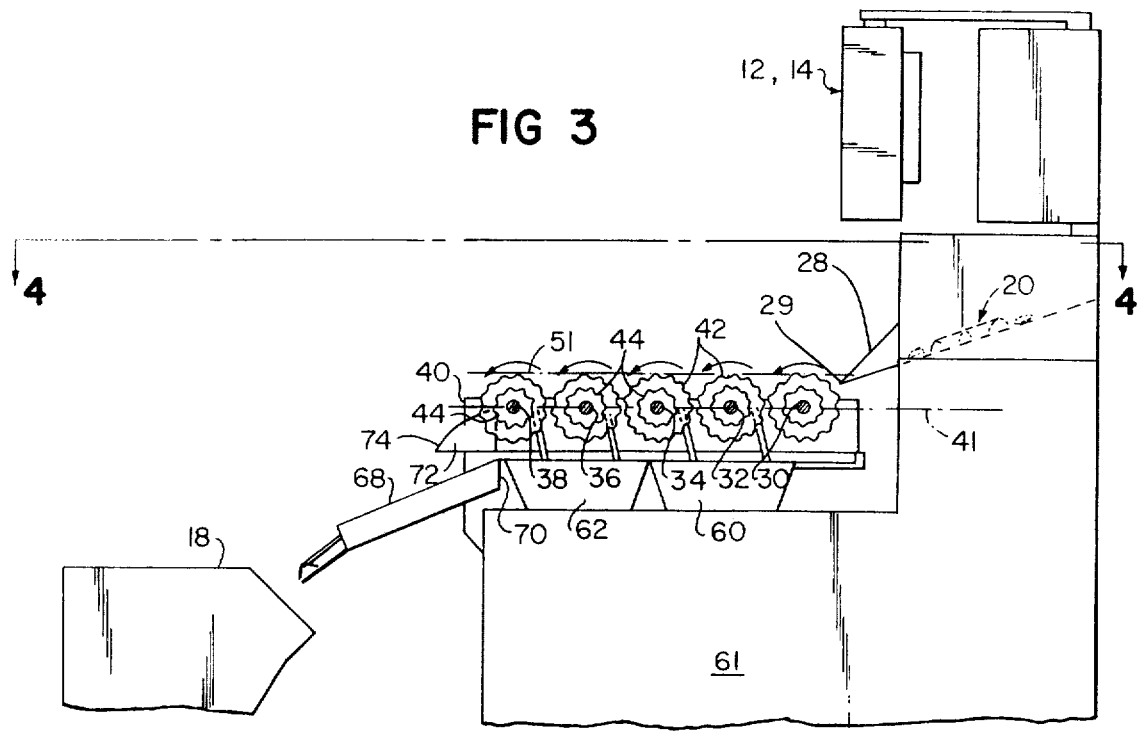
FIG. 3 is a side elevation of apparatus constructed according to the invention.
Figure 4:
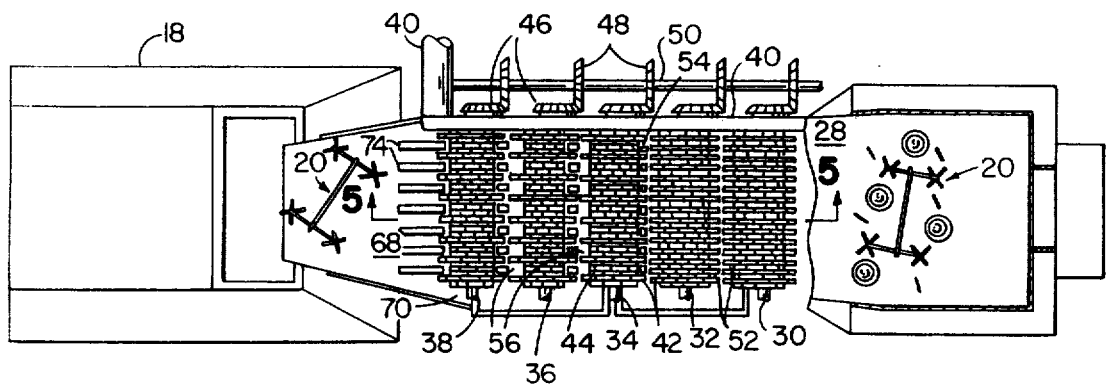
FIG. 4 is a top elevation of the apparatus of FIG. 3.

Referring now to FIGS. 3 and 4, press 12, which includes detacher 14, has a chute 28 with lower end 29 communicating with detacher 14 and arranged to deposit pieces 24 and 26 and trees 20 on recovery and separating apparatus 16. Apparatus 16 has five shafts 30, 32, 34, 36, and 38 mounted on supporting frame 40 and having their longitudinal axes disposed in a horizontal plane 41 which lies below end 29 of chute 28. Each of shafts 30, 32, 34, 36, and 38 has mounted thereon a plurality of large serrated disks 42 with smaller serrated disks 44 mounted between disks 42. Mounting of the disks 42 and 44 may be by any convenient means for example, by the use of notches in the shafts and mating center openings in disks 42 and 44. As can be seen in FIG. 4 on shafts 30 and 32, there is one small disk 44 between two large disks 42, and on shafts 34, 36, and 38 there are three small disks 44 between two large disks 42.

Figure 5:
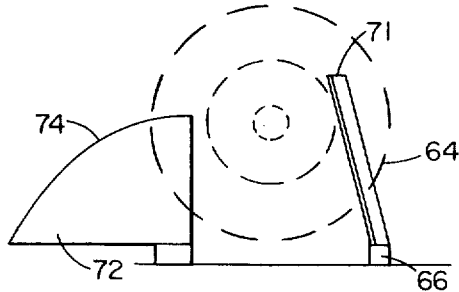
FIG. 5 is an enlarged cross-sectional view taken along line 5—5 in FIG. 4, of a portion of the apparatus of FIGS. 3 and 4.

Each of shafts 30, 32, 34, 36, and 38 has a bevel gear 46 fixed to one end thereof outside frame 40 and arranged to mesh with bevel gears 48 mounted on shaft 50 which may be rotated by means of a motor (not shown). Disks 42, when viewed from the side as in FIG. 3, cooperate to define planar surface 51 having generally horizontal planar dimensions greater than those of trees 20. Detacher 14 and chute 28 are arranged to align longer runner 23 in a horizontal plane in parallelism with surface 51 as trees 20 slide off chute 28. Disks 42 and 44, when viewed from above as in FIG. 4, cooperated to define between them openings of three different sizes. Openings 52 are between shafts 30 and 32 and openings 54 between shafts 32 and 34 are larger than openings 52. Openings 52 and 54 are sized to permit pieces 24 to pass therethrough, but are sufficiently smaller to prevent pieces 26 from passing therethrough. Openings 56 between shafts 34 and 36 and between shafts 36 and 38 are larger than openings 54 and are sized to permit pieces 26 to pass therethrough, but are sufficiently small to prevent trees 20 from passing therethrough. An open container 60 on supporting structure 61 is disposed below openings 52 and 54 and an open container 62 is disposed below openings 56 on structure 61. As is best shown in FIG. 5, a plurality of rectangular fingers 64, which may be constructed of plastic or other suitable material, and supported by any convenient means, for example, by fixing fingers 64 on struts 66 mounted on frame 40 parallel to the shafts, are disposed in openings 52, 54, and 56 adjacent shafts 32, 34, 36 and 38, are tilted counterclockwise at an angle from a line perpendicular to plane 41 and are arranged to define chutes, in each opening, extending from a top edge 71 substantially adjacent the upper serration on disks 42 to the vicinity of the particular container 60 or 62 above which they are disposed. A chute 68, communicating to grinder 18, has its upper end 70 disposed below the disks 44 mounted on shaft 38. Guides 72 are supported on frame 40, for example, by struts 66, between shaft 38 and chute 68, and each have an upper surface 74 which slopes downwardly from a point above plane 41, near shaft 38 to a point above chute 68.

In operation the motor is started and shaft 50 is rotated in the clockwise direction when viewed from the direction of chute 28 and shafts 30, 32, 34, 36, and 38 rotate in the counterclockwise direction as designated by the arrows in FIG. 3. Trees 20 and pieces 24 and 26 slide down chute 28 from detacher 14 and are deposited on surface 51 between shafts 30 and 32. Many of waste pieces 24 drop through openings 52, while the remaining waste pieces 24 and trees 20 and pieces 26 are carried by the serrations on disks 42 and 44 beyond shaft 32 in the direction of shafts 34 and 36. The remaining waste pieces 24 drop through openings 54 into container 60 and trees 20 and pieces 26 are carried further in the direction of chute 68 by the serrations. Fingers 64, in addition to functioning as chutes for conveying pieces 24 to container 60, prevent the pieces 24 from dropping on top of rotating shafts 32 and 34 and thereby being deflected upwardly onto the floor or into container 62 and since top edges 71 are substantially adjacent the upper serrations on the disks 42, cooperate with openings 54 to prevent any pieces 24 from being carried beyond shaft 34. Pieces 26 drop through openings 56, either between shafts 34 and 36 or between shafts 36 and 38, into container 62, while the fingers 64 disposed in openings 56 provide chutes for conveying pieces 26 to container 62, and prevent pieces 26 from being deflected upwardly by shafts 36 and 38 and from being carried beyond shaft 38. Trees 20 are carried until they are deposited on surfaces 74 of guides 72, whereupon they slide onto chute 68 and into grinder 18 in which they are ground into pellets which are returned to plastic supply 10 where they are melted for reuse.

Thus, the invention provides for recovery of the trees 20, while it separates pieces 24 and 26, automatically and simultaneously, yet is simple and inexpensive and is extremely reliable in discriminating between different sizes of pieces. Thus it could be employed to separate workpieces of different sizes from each other and from waste pieces. As is readily apparent, the invention may be modified in many different particulars. For example, the number of parallel shafts may be varied depending upon the number of different sizes of pieces coming from the tree separator or the number of shafts and/or the spacing between them may be varied, together with the thickness and outer diameter of disks 42 and 44, in order to increase or decrease the sensitivity of the invention to differences between sizes of pieces. The disks 42 and 44 need not be serrated, but given proper relative sizes of disks 42 and 44, may simply have edges which are composed of any frictional material. In addition as an example of one of many other obvious modifications, the containers 60 and 62 may be replaced by conveyor belts where desirable.

While a particular embodiment of the invention has been shown and described and several modifications thereof described, still other modifications will occur to those skilled in the art and therefore it is not intended that the invention be limited to the disclosed embodiment or to details thereof and departures may be made therefrom within the spirit and scope of the invention as defined in the claims.

I claim:

1. In combination with an injection molding machine producing a mixture of workpieces and detached connecting molding runners therefor having planar dimensions much greater than said workpieces, that improvement which consists of:
means for separating said workpieces from said runners including discriminating means having a generally horizontal transverse dimension greater than a planar dimension of said runners and defining openings having a transverse dimension less than the planar dimensions of said runners and greater than a dimension of said workpieces for movement of said workpieces through said openings and said runners across said openings and conveying and aligning means for conveying said mixture from said molding machine to said discriminating means and for aligning said runners with their planar dimensions in parallelism with said generally horizontal transverse dimension of said discriminating means to prevent said runners from passing through said openings, said conveying and aligning means comprising means having a generally horizontal supporting surface for said workpieces and runners extending between said molding machine and said discriminating means to receive said runners and said workpieces from said molding machine and to convey them to said discriminating means, said supporting surface aligning said runner in parallelism with said generally horizontal transverse dimension while conveying said runners and said workpieces to said discriminating means.

* * * * *